United States Patent [19]

Newton

[11] 4,453,777

[45] Jun. 12, 1984

[54] RELAY VALVE ASSEMBLY

[75] Inventor: Ronald O. Newton, Adams, N.Y.

[73] Assignee: General Signal Corporation, Stamford, Conn.

[21] Appl. No.: 499,450

[22] Filed: May 31, 1983

Related U.S. Application Data

[63] Continuation of Ser. No. 224,932, Jan. 14, 1981, Pat. No. 4,421,360.

[51] Int. Cl.³ .............................................. B60T 8/18
[52] U.S. Cl. .................... 303/2; 105/215 C; 188/195; 303/22 A; 303/40; 303/85
[58] Field of Search ............. 105/215 C; 303/2, 22 A, 303/22 R, 23 R, 23 A, 28–30, 70, 33, 40, 36–39, 41–47, 64–67, 68–69, 71–83, 85, 86, 3; 188/195, 152

[56] References Cited

U.S. PATENT DOCUMENTS

| | | | |
|---|---|---|---|
| 2,447,857 | 8/1948 | Hewitt | 303/22 R |
| 2,919,164 | 12/1959 | Weber, Jr. | 303/22 A |
| 3,275,380 | 9/1966 | May | 303/22 A X |
| 3,731,982 | 5/1973 | Paginton | 303/37 X |
| 3,734,575 | 5/1973 | Paginton | 303/33 |
| 4,316,418 | 2/1982 | Hindin et al. | 105/215 C |

*Primary Examiner*—Douglas C. Butler
*Attorney, Agent, or Firm*—Barnes & Thornburg

[57] ABSTRACT

A fluid system for the rail brake cylinder of a highway/rail vehicle including a control valve responsive to brake pipe pressure drops to provide a control signal to a variable load relay valve assembly which provides brake cylinder pressures. The relay valve assembly maintains the rail brakes deactivated in the highway mode, provides braking pressure independent of the variable load portion for low pressure in the control valve's auxiliary reservoir, maintains a rail reservoir and rail suspension supply changed from the highway and rail supply lines, and creates an emergency condition in the brake pipe for low rail supply line and or rail reservoir pressure.

9 Claims, 2 Drawing Figures

RELAY VALVE ASSEMBLY

This is a continuation, of application Ser. No. 224,932, filed Jan. 14, 1981, now U.S. Pat. No. 4,421,360.

BACKGROUND OF THE INVENTION

The present invention relates generally to air brake systems and more specifically for an air brake system and a relay valve to be used in a vehicle convertible between highway and railroad modes of use.

There has always been a great interest in the combined transportation of highway and rail vehicles. This has generally included the loading of road trailers onto flat bed rail cars which are then transported across the rails and then driven to location away from the rails. Efforts have also been made to equip trailers with road wheels and rail wheels such that the trailer itself forms both a road trailer and a rail car. One such vehicle is described in U.S. Pat. Nos. 4,202,267 and 4,202,276 to Browne et al. The major problem with the prior art system including that of the above-mentioned patents is that the designers have generally designed a brake system using highway technology and criteria which is unacceptable for use in a rail system.

As an example, the system in the aforementioned U.S. Patents use a straight air brake system to operate the brake. In this system the pressure and the brake pipe line are used to control a relay valve which in turn controls the brakes. This style of system had been used extensively in rail vehicles but has been replaced by ABD (air brake diaphragm) valves wherein the valve is responsive to modulation of the brake pipe pressure to produce its own brake control signal. A major advantage of the ABD valves is that they provide better control and quicker response as well as the capability of providing braking control for a further distant or longer length train.

Thus there exists a need for a braking system for a vehicle which is capable of highway and railway operation with a rail fluid braking system meeting the standards of the rail industry.

SUMMARY OF THE INVENTION

An object of the present invention is to provide a fluid brake control system for a vehicle which may be used for highway as well as rail travel which incorporates the principle of modern rail technology.

Another object of the present invention is to provide a rail brake system for use on a vehicle which is capable of highway as well as rail usage.

Still another object of the present invention is to provide a rail brake system for a vehicle which is capable of highway as well as rail usage wherein the rail brakes are automatically deactivated during highway use.

Even another object of the present invention is to provide a rail braking system including a control valve and a relay valve wherein the relay valve is responsive to low pressure in the reservoirs of the control valve.

Still even a further object of the present invention is to provide a rail fluid braking system including a control valve and relay valve wherein the relay valve provides an emergency brake signal on the brake line for low pressure in the rail supply line or rail reservoir.

An even further object of the present invention is to provide a brake control system for a vehicle which is capable of highway as well as rail travel wherein the suspension system and the reservoir of the braking system for each car are maintained charged by the rail supply line and the highway supply line.

These and other objects of the invention are attained by providing a fluid brake control system including a brake control pipe, a control valve responsive to the change of pressure in the brake control pipe to provide a control signal, a rail supply line and a highway supply line, and a relay valve assembly responsive to the control signal from the control valve and other sensed conditions to provide the appropriate brake cylinder pressures and signals. The relay valve assembly is responsive to the presence of predetermined pressure in the highway supply line for maintaining the rail brake cylinder deactivated by connecting the rail brake cylinder to an exhaust port. A load responsive, movable fulcrum lever interconnects a first piston responsive to the control signal from the control valve and a self-lapping relay valve piston which connects a rail reservoir to the rail brake cylinder. A piston in the relay valve assembly whose axis is colinear with the relay valve axis is responsive to low pressure in the auxiliary reservoir of the control valve to actuate the relay valve independent of the variable load fulcrum. Check valves in the relay valve assembly interconnect the highway supply line and the railroad supply line to a rail reservoir and the rail suspension system such that the rail suspension system and the rail reservoir are maintained fully charged irrespective of the mode of use of the vehicle. The relay valve assembly includes a piston valve response to low pressure in the rail supply line to interconnect the brake pipe to exhaust thereby creating an emergency pressure drop in the brake pipe so that the control valve will produce an emergency braking signal to the relay valve assembly.

Other objects, advantages and novel features of the present invention will become apparent from the following detailed description of the invention when considered in conjunction with the accompanying drawings.

DESCRIPTION OF THE PREFERRED EMBODIMENTS

Figure 1:
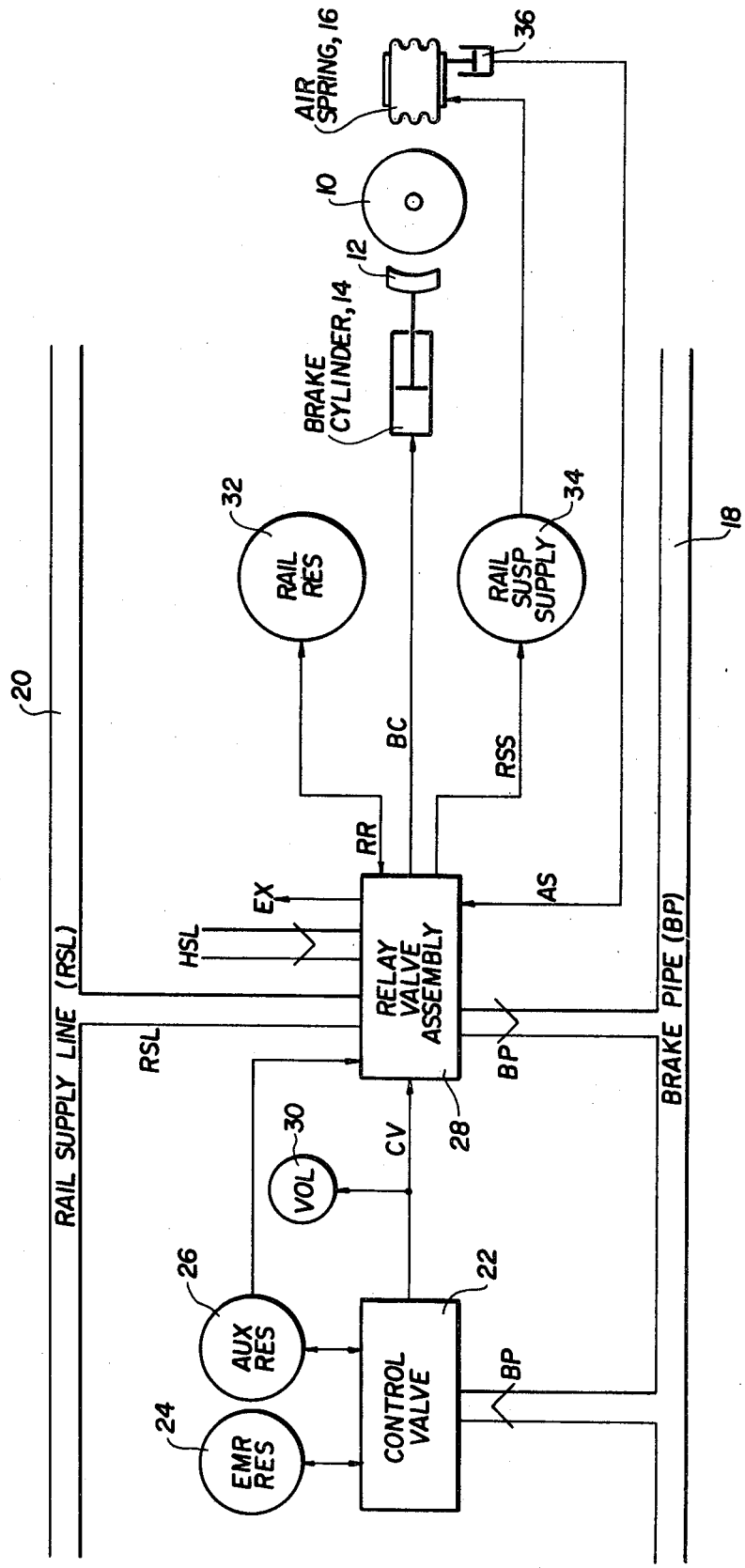
FIG. 1 is a block diagram of the brake control system incorporating the principles of the present invention for use on a vehicle capable of highway and rail use.

As illustrated in FIG. 1, each car includes at least a pair of rail wheels 10, a brake shoe 12, and a brake cylinder 14 as well as a suspension 16 illustrated as an air spring. It should be noted that some vehicles which are capable of rail as well as highway use include one pair of wheels and apropriate brakes or may include two pairs of wheels and appropriate brakes. For sake of illustration, FIG. 1 shows a single wheel and brake connected to the fluid brake control system. Each car or trailer includes a brake pipe 18 and a rail supply line 20 both extending the length of the car with couplings at each end to a preceding and following car.

The fluid brake control system includes a control valve 22 having an emergency reservoir 24 and an auxiliary reservoir 26. Control valve 22 may be an ABDW valve which is responsive to a change in pressure in the brake pipe to provide a proportional output from the auxiliary reservoir 26 as a control signal CV. For an emergency condition or pressure drop in the brake pipe, the control valve 22 provides an emergency control signal CV using both the auxiliary reservoir 26 and the emergency reservoir 24. The operation of the ABDW valve is well known and thus will not be described in detail.

The control signal CV from the control valve 22 is an input or pilot signal to the relay valve assembly 28. As will be evident from the description of the relay valve assembly in FIG. 2, the control signal CV is a pilot signal and the volume of the relay valve assembly in which it acts as relatively small. Thus the auxiliary reservoir 26 and the emergency reservoir 24 may be substantially smaller than those used with a standard control valve 22. It should be noted that the volume of the relay valve assembly 28 which is responsive to the control signal CV is even so small that a volume 30 must be provided such that the combination of the volume 30 and the relay valve assembly 28 which receives a control valve signal in relationship to the auxiliary reservoir 26 and emergency reservoir 24 is proportional to the relationship of a brake cylinder and a full service auxiliary reservoir and emergency reservoir. It should be noted that the volume 30 may be deleted if sufficient volume is provided in the relay valve assembly 28.

The relay valve assembly 28 includes an input from rail supply line RSL 20 as well as highway supply line HSL. These are used through the relay valve assembly to charge the rail reservoir 32 and the rail suspension supply 34. Air spring 16 is charged by the rail suspension supply 34 as is well known. As will be explained more fully in relationship to FIG. 2, the relay valve assembly 28 maintains the rail reservoir 32 and the rail suspension supply 34 charged using either the rail supply line RSL or the highway supply line HSL. In normal operation, the relay valve assembly 28 controls the pressure BC to the brake cylinder 14 in response to the control signal CV using fluid from the rail reservoir 32. The relay valve assembly 28 is a variable load relay valve including a load sensor 36 connected to the air spring 16. This provides a load signal AS. The operation of the relay valve in response to control signal CV is varied using the load signal AS.

The relay valve assembly 28 is also responsive to the presence of a predetermined fluid pressure in the highway supply line HSL to deactivate the brake cylinder 14 by connecting it to the exhaust port EX. This prevents the brake 12 from being actuated when the vehicle is being used in the highway mode. Pressure in the auxiliary reservoir 26 of the control valve 22 is monitored by the relay valve assembly 28. For a low pressure in the auxiliary reservoir 26, the relay valve assembly 28 applies a large brake signal from the rail reservoir 32 to the brake cylinder 14. Thus if the auxiliary reservoir 26 has a low level, the relay valve assembly will actuate the brake since the control valve is not capable of providing a control signal CV to actuate the brake in response to an appropriate signal on the brake pipe 18.

For a ruptured, disconnected or otherwise inoperable railroad supply line or rail reservoir, the relay valve assembly 28 connects the brake pipe 18 to exhaust so as to create an emergency pressure drop in the brake pipe. The control valve 22 detects the emergency pressure change and applies an emergency control signal CV to the relay valve assembly 28 which in turn applies an emergency brake condition to the brake cylinder 14.

Figure 2:
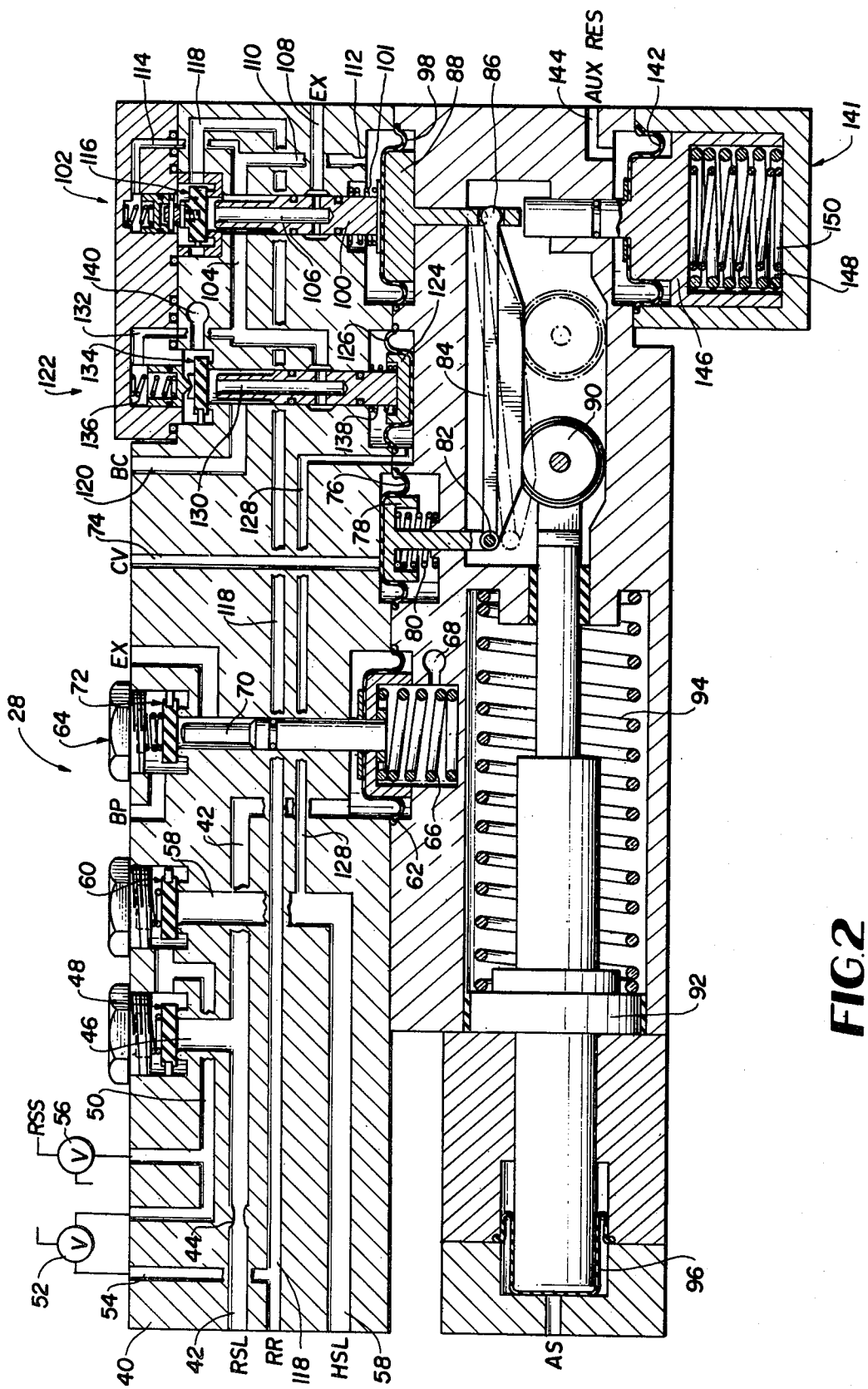
FIG. 2 is a cross-sectional representation of a relay valve assembly incorporating the principles of the present invention.

The relay valve assembly is illustrated in detail in FIG. 2 and includes a housing 40. The railroad supply line RSL is connected via passage 42 having restriction 44 and passage 46 to a check valve 48. The output of the check valve is connected via passage 50, valve 52 and passage 54 to the rail reservoir RR. The other side of the check valve 48 is also connected via passage 50 and valve 56 to the rail suspension supply RSS. The highway supply line HSL is connected via passage 58 to check valve 60 with the other side being connected to passage 50. Thus, it can be seen that the rail suspension supply RSS and the rail reservoir RR may both be charged either by the rail supply line through check valve 48 or the highway supply line through check valve 60. It can also be seen that a leak downstream of check valve 48 that is larger than the flow or maintaining capabilities of restriction 44 will create a pressure drop in passage 42. It can also be seen that a pressure drop in rail supply line can also cause a pressure drop in passage 42.

Passage 42 is connected to the top of diaphragm 62 of brake pipe vent valve 64. The pressure on the top of diaphragm 62 from passage 42 acts against spring 66 on the bottom of the diaphragm. The space underneath the diaphragm is vented to exhaust via port 68. Piston 72 is connected to the diaphragm 62 and its movement controls check valve 72 which interconnects the brake pipe BP and the exhaust EX. Spring 66 is selected such that when the pressure in passage 42 drops below a predetermined pressure, for example 80 p.s.i., the spring 66 forces the piston 70 against the check valve 72 to connect the brake pipe BP to exhaust EX. This creates an emergency rate of brake pipe pressure reduction that will be sensed by control valve 22, which will in turn react and propagate the emergency rate throughout the train. Each car will sense the emergency brake rate reduction and so control the remainder of the relay valve assembly to brake each of the cars. Not only does this give an indication of a failure in the railroad supply line or rail reservoir, but by providing an emergency brake signal to all the cars, the undesirable application of vehicle-equipped spring brakes which is held released with rail reservoir pressure, does not go undetected.

The control signal CV from the control valve 22 is applied through passage 74 to the top of diaphragm 76 which will rest on piston 78. A spring 80 maintains the piston 78 in its utmost position. The piston 78 is pivotally connected at 82 to a lever 84. The opposite end 86 of lever 84 is received in the base of piston 88. A roller fulcrum 90 determines the mechanical force relationship between the piston 78 and 88. The roller fulcrum 90 is rotatably mounted at one end of piston 92 which is held to the far left position by spring 94. The other end of piston 92 rests against diaphragm 96. The opposing side of the diaphragm is sensitive to the sensed load of the vehicle via air spring signal AS. For an air spring signal below the rating of the spring 94, the roller fulcrum is in the position illustrated in FIG. 2 which is considered an 18% location compared to the 100% location in phantom. These percentages are the transfer or the relationship of the control signal CV to the output braking signal Bc. Thus for the lightest load, the brake cylinder pressure signal is 18% of the control signal CV and for a full load, the brake cylinder pressure is 100% of the control signal CV.

Over piston 88 is diaphragm 98 and spool 100 and return spring 101 of self-lapping spool valve 102. The output channel 104 from the relay spool valve 102 is connected to the interior channel 106 of spool 100 to exhaust channel 108. Output channel 104 is also connected by passage 110 and restriction 112 to the top of diaphragm 98. Passage 114 connects the output of passage 104 of the valve to the top of check valve 116 which interconnects the output passage 104 and a fluid passage 118 connected to the rail reservoir RR.

Connected between the output passage 104 of the relay spool valve 102 and the passage 120 connected to the brake cylinder BC is a brake cylinder release valve 122. The piston 124 of the brake cylinder release valve 122 rests on the top surface of a diaphragm 126. The highway supply line HSL is connected through passages 58 and 128 to the other side of diaphragm 126. The piston 124 is hollow and includes a passage 130 which interconnects the output 104 of the relay spool valve 102 and the brake cylinder via passage 120 when in the position shown in FIG. 2. The pressure and output of passage 104 is also communicative via passage 132 to the top of check valve 134 of the brake cylinder release valve 122 to cause it to be remained seated. Spring 136 maintained the check valve 134 seated and spring 138 maintains the plunger 124 in its down or lowered position.

When the vehicle is to be used in the highway mode, highway supply line HSL is activated and connected to passages 58 and 128 which provides a pressure on the bottom of diaphragm 126. For a preselected pressure, for example 25 p.s.i., plunger 124 is raised closing the passage 130 of the plunger against the check valve. This cuts off the communication between the output 104 of the relay spool valve 102 and the brake cylinder passage 120. Upon the pressure rising above the predetermined pressure, the plunger continues its upward movement opening the check valve 124 thereby interconnecting the brake cylinder and the brake cylinder passage 120 to exhaust port 140. Thus, when the vehicle is connected for highway use as detected by brake cylinder release valve 122, the relay spool valve 102 is disconnected from controlling the brake cylinder and the brake cylinder is connected to exhaust thereby deactivating the brake cylinder. This prevents the brake cylinder from operating while in the highway mode. This is important since if the brake cylinder was locked in the highway mode even though the rail wheels are not on the ground, severe damage may occur to the rail wheels if they should hit the ground and not be free to spin.

With the brake cylinder release valve 122 in the position illustrated in FIG. 2, the output 104 of the self-lapping release spool valve 102 is effectively connected to the brake cylinder passage 120. When the control valve 22 senses a brake pressure reduction, it responds by generating a control signal CV to passage 74 of the relay valve assembly 28. This signal on diaphragm 76 drives piston 78 downward which affects an upward motion of piston 88 through lever 84. The actual displacement of piston 88 is a function of displacement of piston 78 and the position of the movable fulcrum 90 which varies with the sensed load. The piston 88 drives spool 100 upward such that the interior passage 106 is sealed closed against the check valve 116. This disconnects the brake cylinder passage 120 from the exhaust port 108.

Further removement of piston 88 and spool 100 unseats the check valve 116 and allows fluid under pressure from the rail reservoir RR through passage 118 to be ported through passages 104, 130 and 120 to the brake cylinder on the vehicle.

The fluid pressure from rail reservoir passage 118 is also applied through passage 110 to the top of diaphragm 98 which forces the piston 88 in the opposite direction or downward when the back pressure from the brake cylinder is greater than the force created by the control signal via piston 78 and lever 84. Thus, the relay spool valve 102 matches a brake cylinder pressure with the pressure on piston 88 which is a function of the control valve signal CV as varied by the sensed load.

The relay valve assembly 28 also includes an auxiliary reservoir protection device 141. The diaphragm 142 is connected by passage 144 to the auxiliary reservoir and is mounted to a plunger 146. Springs 148 and 150 force the plunger 146 upward and is maintained in its down position by the pressure of the auxiliary reservoir. When the pressure in the auxiliary reservoir and passage 144 is less than a predetermined pressure, for example 32 p.s.i., the springs 148 and 150 cause the plunger 146 to rise coming into contact with plunger 88 to activate the relay spool valve 102. It should be noted that the axis of plunger 146 is co-linear with the axis of plunger 88 and both of which are parallel to the axis of plunger 78 of the control valve signals CV. This feature maintains the integrity of the relay valve assembly 28 to apply pressure to the brake cylinder from the rail reservoir RR regardless of the status of the auxiliary reservoir of the control valve 22. This feature is necessary when the vehicle has been used extensively in the highway mode and then parked on a rail siding with fully charged rail reservoirs but depleted auxiliary reservoir.

In the preceding description of the preferred embodiment, it is evident that the objects of the invention are attained in that a fluid control brake system for a vehicle which is capable of highway and rail use is provided with many necessary features and compatibility with rail systems. Although the invention has been illustrated and described in detail, it is evident that this is by way of illustration and example only and is not to be taken by way of limitation. The relay valve assembly 28 as illustrated in FIG. 2 is but an example of one layout of the required valves and elements and other layouts may be constructed. The essence of the present invention is the use of specific valves performing specific functions and the fluid communication of the different elements and not necessarily the layout. Although the brake control system as illustrated in FIG. 1 shows many distinct elements, the relay valve assembly 28 is an integrated unit and may be mounted to the face of a control valve 22 thereby eliminating extended interconnections. Although the relay valve assembly 28 was designed for the rail brake system of a vehicle having rail and highway modes, certain features of the valve assembly are unique and distinct within themselves and may be used on any rail brake system. Thus, the spirit and scope of the present invention are to be limited only by the terms of the appended claims.

What is claimed is:

1. In a vehicle having rail wheels, road wheels, a brake system for said rail wheels including a rail brake cylinder and a fluid brake control system, the improvement being said brake control system which comprises:
   a rail brake control pipe for transmitting rail brake signals;
   control valve means responsive to brake signal changes of pressure in said brake control pipe to provide control signals;

rail supply line to be charged during rail use;

highway supply line separate and distinct from said rail supply line to be charged during highway use; and relay valve means responsive to said control signal for governing the flow of fluid from said rail supply line to said rail brake cylinder and responsive to the presence of a predetermined pressure in said highway supply line for maintaining said rail brake cylinder deactivated.

2. The fluid brake control system according to claim 1 wherein said relay valve means includes a first valve means responsive to said control signal for governing the flow of fluid from said rail supply line to the rail brake cylinder and a second valve means connected between said rail brake cylinder and said first valve means for interconnecting said first valve means and said rail brake cylinder for a highway supply line pressure below said predetermined pressure and for disconnecting said rail brake cylinder from said first valve means and interconnecting said rail brake cylinder to exhaust for a highway supply line pressure above said predetermined pressure.

3. The fluid brake control system according to claim 1 including a rail reservoir connected as an input to said relay valve means with said rail supply line, and check valve means interconnecting said rail reservoir and said rail and highway supply lines for maintaining said rail reservoir charged by said rail and highway supply lines.

4. The fluid brake control system according to claim 3 including a rail suspension system on said vehicle and wherein said check valve means also interconnects said rail suspension system and said rail and highway supply lines for maintaining said rail suspension system charged by said rail and highway supply lines.

5. The fluid brake control system according to claim 1 including emergency valve means connected to said brake control pipe and said rail supply line for creating an emergency brake pressure change in said brake control pipe for pressure in said rail supply line below a predetermined pressure.

6. The fluid brake control system according to claim 5 including an auxiliary reservoir and an emergency reservoir connected to said control valve means, and wherein said control valve means provides a control signal from said auxiliary reservoir proportional to the change of pressure in said brake control pipe except for an emergency brake pressure change wherein said control signal is from both said auxiliary and emergency reservoirs.

7. The fluid brake control system according to claim 5 including a rail supply reservoir connected to said relay valve means and connected to said emergency valve means, said emergency valve means is also responsive to the pressure in said rail reservoir.

8. The fluid brake control system according to claim 1 including means for sensing the load carried by the vehicle, and wherein said relay valve means includes means for varying the response of said relay valve to said control signal as a function of said sensed load.

9. The fluid brake control system according to claim 8 including an auxiliary reservoir connected to said control valve means as the source for said control signal produced by said control valve means and said relay valve means includes means for sensing the pressure in said auxiliary reservoir and governing the flow of fluid to the rail brake cylinder for a sensed auxiliary reservoir pressure below a predetermined pressure independent of said control signal and said sensed load.

* * * * *

UNITED STATES PATENT AND TRADEMARK OFFICE
CERTIFICATE OF CORRECTION

PATENT NO. : 4,453,777
DATED : June 12, 1984
INVENTOR(S) : Ronald O. Newton

It is certified that error appears in the above—identified patent and that said Letters Patent is hereby corrected as shown below:

Column 1, line 21, delete "4,202,267 and 4,202,276" and insert therefor --4,202,276 and 4,202,277--.

Column 2, lines 31 and 32, delete "response" and insert therefor --responsive--.

Signed and Sealed this

Twenty-fifth Day of September 1984

[SEAL]

Attest:

GERALD J. MOSSINGHOFF

Attesting Officer

Commissioner of Patents and Trademarks